(12) United States Patent
Johnson (10) Patent No.: US 11,038,335 B2
(45) Date of Patent: Jun. 15, 2021

(54) SYSTEMS AND METHODS TO DETECT AND REACT TO OBJECTS IN PROXIMITY TO POWER SYSTEMS

(71) Applicant: Avista Corporation, Spokane, WA (US)

(72) Inventor: Greg Johnson, Spokane, WA (US)

(73) Assignee: Avista Corporation, Spokane, WA (US)

( * ) Notice: Subject to any disclaimer, the term of this patent is extended or adjusted under 35 U.S.C. 154(b) by 298 days.

(21) Appl. No.: 16/159,568

(22) Filed: Oct. 12, 2018

(65) Prior Publication Data
US 2020/0119538 A1 Apr. 16, 2020

(51) Int. Cl.
*H02H 1/00* (2006.01)
*H02H 5/12* (2006.01)
*H02H 7/26* (2006.01)

(52) U.S. Cl.
CPC ........ *H02H 1/0023* (2013.01); *H02H 1/0092* (2013.01); *H02H 5/12* (2013.01); *H02H 7/26* (2013.01)

(58) Field of Classification Search
CPC .. H02H 1/0007; H02H 1/0061; H02H 1/0092; H02H 1/0023; H02H 3/04; H02H 3/10; H02H 5/12; H02H 7/005; H02H 7/26; F16P 3/12
See application file for complete search history.

(56) References Cited

U.S. PATENT DOCUMENTS

| | | | | |
|---|---|---|---|---|
| 2007/0229298 A1* | 10/2007 | Frederick | ............... | G08C 17/02 340/13.25 |
| 2008/0142486 A1* | 6/2008 | Vicente | .................. | H02H 3/006 218/154 |
| 2012/0154174 A1* | 6/2012 | Schunder | ............... | B60Q 9/008 340/905 |
| 2013/0300566 A1* | 11/2013 | Kumfer | ................. | G08B 25/08 340/686.6 |
| 2014/0312715 A1* | 10/2014 | Peuser | ..................... | H02H 5/12 307/326 |
| 2016/0255420 A1* | 9/2016 | McCleland | ........... | H04W 4/026 340/870.07 |
| 2016/0308345 A1* | 10/2016 | Stoupis | ................ | H02H 1/0084 |
| 2019/0324074 A1* | 10/2019 | Thompson | ............... | H02H 7/26 |
| 2019/0340909 A1* | 11/2019 | Nguyen | ................. | G08B 21/02 |
| 2020/0065433 A1* | 2/2020 | Duff | ....................... | G06Q 19/006 |
| 2021/0073692 A1* | 3/2021 | Saha | ..................... | B64C 39/024 |

\* cited by examiner

*Primary Examiner* — Gustavo A Rosario-Benitez
(74) *Attorney, Agent, or Firm* — Lee & Hayes, P.C.

(57) ABSTRACT

Systems and techniques are disclosed that monitor an area adjacent to power system components and detect objects that may pose a probable risk of causing a fault, for example, making contact with the power system component. Various embodiments initiate a preventative, a corrective, and/or a mitigative action in advance of the fault. Examples of possible actions include, but are not limited to, an audible alert, a visual alert, a tactile alert, a remote notification, a limiting of machinery motion, a stopping of machinery motion, a reversing of machinery motion, de-energization of the power system component, or combinations thereof.

28 Claims, 8 Drawing Sheets

SYSTEMS AND METHODS TO DETECT AND REACT TO OBJECTS IN PROXIMITY TO POWER SYSTEMS

BACKGROUND

Presently, electrical protection systems, that meet industry standards, monitor current to detect faults after they occur and react to minimize damage. Reacting to stop a fault after it occurs is insufficient for many situations, most notably protecting human life which can be lost upon fault onset or initial contact with energized components or objects.

SUMMARY

This disclosure discusses systems and techniques that may be used to monitor an area adjacent to power system components and detect objects that may pose some probable risk of causing a fault, for example, making contact with the power system component. Various embodiments contemplate initiating a preventative, a corrective, and/or a mitigative action in advance of the fault. Examples of possible actions may include, but are not limited to, an audible alert, a visual alert, a tactile alert, a remote notification, a limiting of machinery motion, a stopping of machinery motion, a reversing of machinery motion, de-energization of the power system component, or combinations thereof.

BRIEF DESCRIPTION OF THE DRAWINGS

The Detailed Description is set forth with reference to the accompanying figures. In the figures, the left-most digit(s) of a reference number identifies the figure in which the reference number first appears. The same reference numbers in different figures indicate similar or identical items.

DETAILED DESCRIPTION

Overview

Presently electrical protection schemes are based upon detecting a fault after it occurs and then quickly reacting, for example, by tripping power off, to reduce damage including the duration of electrical shock, an arc flash, and a fault current. However, this is insufficient for protecting human life because electrical shock and arc flash—even momentary—can cause death or serious injury. Each year 1 in 5 on the job fatalities occurs in the construction industry. OSHA has even coined the term "Fatal Four" for construction's leading causes of death which includes electrocution. The US Bureau of Labor indicates that 35% of occupational deaths in the United States are caused by electrocution. The reactive nature of present electrical protection schemes may not even be adequate for property damage protection as it trips power off only after an electrical fault occurs. An electrical fault of even a short duration can ignite a fire in a structure, field, or forest, resulting in thousands or millions of dollars of damage.

The present industry approach of acting reactively, line crews as well as non-electrical workers are at risk, for example, roofers, construction workers, scissor lift operators, arborists, among others. Presently, for example, the following are causes of many of the fatalities experienced using present reactive systems: raising a scissor lift up into powerlines, ladders and poles making contact with powerlines, tree trimmers dropping branches on powerlines, touching heavy equipment after it contact powerlines, fallen powerlines, unearthed guy wires contacting energized equipment, among others.

However, various embodiments of the pre-fault detection system (PFDS) provide additional protection, by de-energizing, or tripping power off, before an electrical shock or arc flash occurs. For example, various embodiments of the PFDS may use a sensor, for example radar, to detect an imminent fault or contact with a conductor before it can occur and proactively trips power off thus preventing any loss of human life or other potential damage. Various embodiments of the PFDS may prevent the following electrical hazards: electrical shock, arc flash incident energy (thermal hazard), arc flash blinding light, arc flash deafening sound, arc flash blast pressure (blunt force trauma), arc flash projectile and molten metal, arc flash toxic combustion by-products, fault current, among others. In addition to saving lives of users, various embodiments of the PFDS may reduce damage, for example, fires, caused by trees or other material falling on power lines, may provide a warning or alert of encroachment to energized equipment, and may provide a record of encroachments into designated electrical space, for example, to aid in preventative training among others. In short, damage (human life, property, etc.) occurs the instant contact is made with energized line or equipment. Where, if the power line or equipment can be de-energized prior to contact, or if machinery and equipment can be forced to stop prior to contact, or a warning system can alert someone prior to contact, the damage can be avoided.

Various embodiments contemplate that the PFDS may watch a space around the powerline, and when anything either crosses the invisible boundary line at a threshold distance or has a likely trajectory to make contact with the power system component, it immediately initiates a preventive, corrective, or mitigative action such as sends a signal to a power system component feeding the powerline, for example a wireless relay, to cut the power and de-energize the powerline. Alternative actions may include an audible alert, a visual alert, a tactile alert, a remote notification, a limiting of machinery or equipment motion, a stopping of machinery or equipment motion, or a reversing of machinery or equipment motion.

Illustrative Operational Environments

Figure 1:
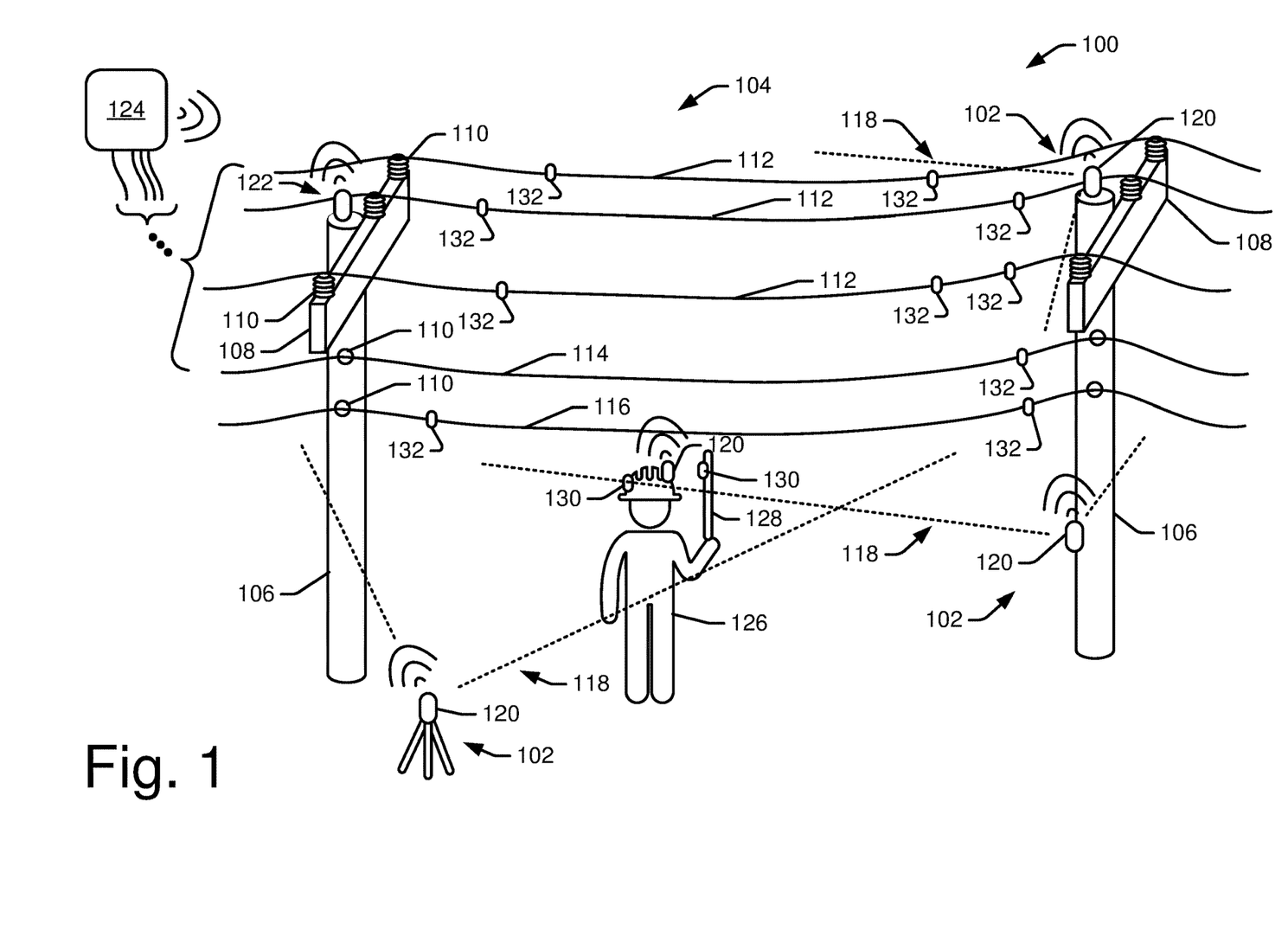
FIG. 1 shows an illustrative embodiment of an operating environment of a system to detect and react to objects in proximity to power systems.

FIG. 1 shows an illustrative operational environment 100 usable to implement pre-fault detection system (PFDS) 102. The operational environment 100 may include a power system 104, for example a power distribution or transmission systems, comprising a power pole system, for example, comprising poles 106 and cross arms 108. Additionally or alternatively, the power system 104 may comprise insulators 110. For example, insulators 110 may be located on the cross arm 108 or on the pole 106. Insulators 110 may be coupled to conductors 112 where conductors 112 may transmit or distribute electrical energy. Conductors may be supported by the power pole system across various distances. For example, various embodiments contemplate that a conductor 112 may be supported by an insulator 110 on cross arm 108. Additionally or alternatively, a conductor may act as a neutral conductor 114 that may be coupled to poles 106. Often, the neutral conductor 114 is coupled to the poles 106 at a distance below conductors 112. Additionally or alternatively, various embodiments contemplate wires and equipment 116 of joint users, for example, telephone and cable companies, coupled to poles 106. Often the joint users wires and equipment are coupled to poles 106 below the neutral conductor 114.

Additionally or alternatively, PFDS 102 may comprise a field of view 118 that a PFDS unit 120 may monitor. Various embodiments contemplate that the field of view 118 may be adjustable or set to monitor a zone of interest, for example, as shown by the dashed lines in FIG. 1. Additionally or alternatively, various embodiments contemplate that PFDS units 120 may work independently, or in coordination with other PFDS units 120. Additionally or alternatively, various embodiments contemplate communicating using wired or wireless communication technology. Additionally or alternatively, various embodiments contemplate using a relay unit 122 to facilitate communication with other PFDS units 120 as well as other power system components 124. For example, power system components 124 may comprise a device that can de-energize conductors 112, for example a recloser or a breaker, among others.

Various embodiments contemplate that PFDS units 120 may be located in one or more locations. For example, a PFDS unit 120 may be located on the ground, on a power system component, for example, a pole, cross arm, a conductor, among others, on a person, on a vehicle, on a tool, among others, or combinations thereof. Various embodiments contemplate that specific or multiple locations may be used based at least in part on physical surroundings, availability of PFDS unit mounting locations, and the type of work to be performed. As an illustrative example, a PFDS unit 120 may be located on a pole and another on a person. In this illustrative example, the PFDS unit 120 on the pole may be readily positioned to monitor a larger zone of interest when compared to a PFDS unit 120 mounted on a person closer to where the work is being performed. In this example, the PFDS units may work together to monitor the zone of interest effectively. For example, the PI-DS unit on the person may provide a better view point or field of view for certain tasks that are conducted closer to a power system component, for example a conductor, a transformer, among others, or combinations thereof or may be partially or entirely blocked by the person, another person, equipment, among others, or combinations thereof.

Additionally or alternatively, various embodiments contemplate that PFDS units 120 may be in communication with power system components 124 directly or through relay unit 122 using wireless or wired technology. PFDS units 120 may be configured to communicate with power system components 124, for example, a recloser or breaker, causing one or more of the power system components 124 to de-energize one or more of the conductors 112.

Additionally or alternatively, various embodiments contemplate that PFDS units 120 may trigger a power system component 124 to de-energize one or more conductors 112 based on various criteria. For example, PFDS units 120 may monitor the zone of interest within field of view 118. Additionally or alternatively, various embodiments contemplate that PFDS units 120 may identify an object within the zone of interest using one or more sensors using one or more sensing technology, for example, Radar, Lasers, Light Detection and Ranging (LIDAR), photometric, infrared, ultraviolet, wireless signals, or combinations thereof, among others. Additionally or alternatively, various embodiments contemplate that PFDS units 120 may use the signals from the sensors to identify an object in the zone of interest. For example, a PFDS unit 120 in shown in FIG. 1 may identify a human 126 within the zone of interest. Additionally or alternatively, the PFDS unit 120 may identify a tool 128. Additionally or alternatively, various embodiments contemplate that the PFDS unit 120 may identify that tool 128 has certain characteristics. For example, the PFDS 102 may identify or estimate characteristics related to size, mass, inertia, conductivity, among others. Various embodiments contemplate identifying the characteristics based on information collected from the zone of interest, from registered objects that are predicted to be in the area or zone of interest, objects providing an identification, or combinations thereof among others.

Additionally or alternatively, various embodiments contemplate that an object, including a user or tool may provide an identification to the PFDS. For example, FIG. 1 shows a human 126 and tool 128 with identification tags 130. Various embodiments contemplate that identification tags 130 may be identified by the PFDS 102 through various methods. For example, the PFDS 102 may detect an identification tag 130 through a communication system (for example, radio, RFID, or wifi, among others), through detection by the sensors monitoring the field of view 118 (for example, a radar signal, a visual indication, among others), or combinations thereof. For example, a tool may have an identification tag 130 that comprises an RFID feature that emits a radio signal that the PFDS unit 120 may receive to identify the specific tool or type of tool, which may be associated with certain characteristics. Additionally or alternatively, various embodiments contemplate that a tool may have an identification tag 130 that comprises a reflector that provides a certain radar signal to a PFDS unit 120 using radar to monitor the zone of interest. Additionally or alternatively, various embodiments contemplate that a tool may have an identification tag 130 that comprises markings or lettering that provides a certain visual signal to a PFDS unit 120 using an optical monitoring system in the visible light range to monitor the zone of interest.

Additionally or alternatively, various embodiments contemplate that identification tags 130 may provide additional information to the PFDS. For example, an identification tag 130 may identify a user or tool with certain permissions to work closer to certain elements of the power system. For example, an electrically insulated tool, for example a hot stick, may have an identification tag 130 that the PFDS 102 identifies it as such. The PFDS 102 may then allow the tool to be very close to or even contact a conductor 112 without causing the PFDS 102 to de-energize the conductors 112 where another tool without the appropriate identification tag would not be allowed as close to a conductor 112. Additionally or alternatively, the human 126 may have an identification tag 130 that identifies the human as an authorized lineman, which may allow the lineman to work closer to conductor 112 without causing the PFDS 102 to de-energize the conductors 112 where another human without the appropriate identification tag would not be allowed as close to a conductor 112 before the system de-energized the conductors 112.

Additionally or alternatively, various embodiments contemplate that an object, for example, power system components, including, but not limited to, a conductor, a cross arm, or other items may provide an identification to the PFDS. For example, FIG. 1 shows a conductor 112/114 with power system components markers 132. Various embodiments contemplate that in some situations, power system components markers 132 may be similar or identical to identification tags 130. For example, a first identification tag 130 may identify a conductor 112 where the PFDS would identify the conductor 112 as an object to keep another object, for example, a human 126 with a second identification tag 130 away from. Additionally or alternatively, various embodiments contemplate that multiple power system components markers 132 may be placed on a single conductor, for example, conductor 112. In this illustrative case, the PFDS may determine the full location in space of the conductor 112, or a portion thereof, based at least in part on a distance between the two or more power system components markers 132, a distance from one or more power system components markers 132 and an insulator, a cross arm, a pole, a transformer, a switch, a recloser, among others, or combinations thereof. For example, a conductor's location in space may be based at least in part on a sag profile of the conductor. Various embodiments contemplate that the location of the conductor may be determined based at least in part on a recorded sag profile of a conductor.

Various embodiments contemplate that a threshold distance may be determined or adjusted based at least in part on how a conductor 112/114, or other items of interest in the zone of interest is identified or located. For example, if a direct observation of a conductor 112 by a PFDS is limited, indeterminate, unverified, or incomplete, one or more power system components markers 132 may be used. In this case, various embodiments contemplate that a tolerance may be increased, a threshold distance may be increased, or combinations thereof, in some instances to allow for determining the conductor location through the use of the markers to extrapolate the conductor location. Additionally or alternatively, various embodiments contemplate that a tolerance may be decreased, a threshold distance may be reduced, or combinations thereof, in some instances where use of one or more markers is used in conjunction with other locating techniques. For example, the use of one or more makers may be used to confirm or validate a conductor location based at least in part on other techniques, for example, direct observation.

Figure 2:
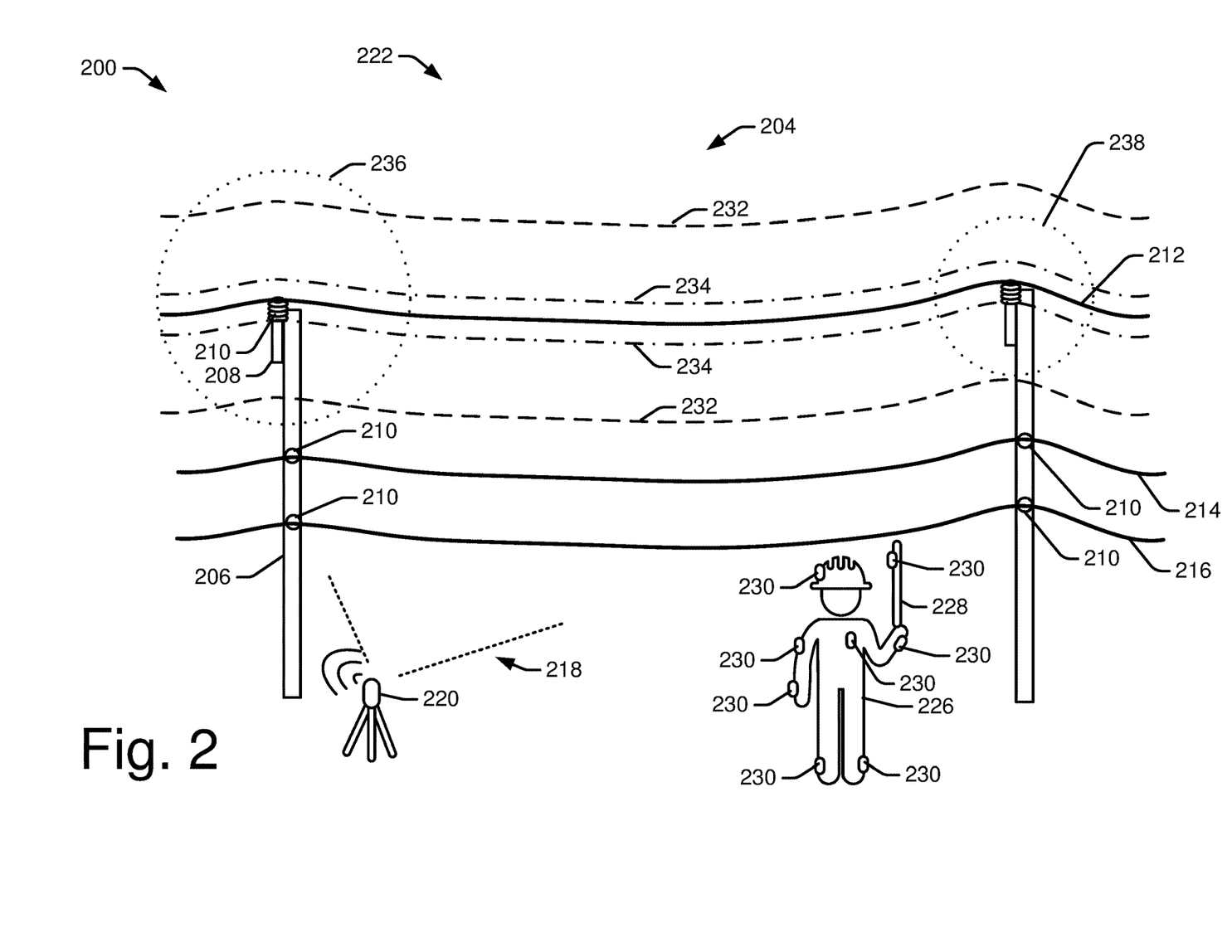
FIGS. 2-3 show other illustrative embodiments of operating environments of systems to detect and react to objects in proximity to power systems.

FIG. 2 shows an illustrative operational environment 200 usable to implement PFDS 202. The operational environment 200 may include a power system 204, for example a power distribution or transmission systems, comprising a power pole system, for example, comprising poles 206 and cross arms 208. Additionally or alternatively, the power system 204 may comprise insulators 210. For example, insulators 210 may be located on the cross arm 208 or on the pole 206. Insulators 210 may be coupled to conductors 212 where conductors 212 may transmit or distribute electrical energy. Conductors may be supported by the power pole system across various distances. For example, various embodiments contemplate that a conductor 212 may be supported by an insulator 210 on cross arm 208. Additionally or alternatively, a conductor may act as a neutral conductor 214 that may be coupled to poles 206. Often, the neutral conductor 214 is coupled to the poles 206 at a distance below conductors 212, for example 6-10 feet. Additionally or alternatively, various embodiments contemplate wires and equipment 216 of joint users, for example, telephone and cable companies, coupled to poles 206. Often the joint users wires and equipment are coupled to poles 206 at a distance below the neutral conductor 214, for example, 30-40 inches.

Additionally or alternatively, PFDS 202 may comprise a field of view 218 that a PFDS unit 220 may monitor. Various embodiments contemplate that the field of view 218 may be adjustable or set to monitor a zone of interest 222. Various embodiments contemplate that the zone of interest 222 may be determined based on the physical characteristics of the power system, the geography of the physical surroundings, as well as the work being done and parties that are present. For example, the type of poles, conductors, power system equipment, cross arm configurations, dead ends, and level of voltage carried by the conductors may cause the zone of interest to expand, contract, or change shape. Additionally or alternatively, the types and proximity of adjacent buildings, trees, inclines, elevation changes, may cause the zone of interest to expand, contract, or change shape.

Additionally or alternatively, various embodiments contemplate that the zone of interest may be set by a user on site through the PFDS unit 220 itself or another interfacing device, set by a preconfiguration setting, set by general guidelines, set by default, or combinations thereof.

Similar to FIG. 1, FIG. 2 shows a PFDS system 202 that may cause the conductors 212 to be de-energized, for example, based on a signal from PFDS unit 220. Various embodiments contemplate that the signal from PFDS unit 220 may be sent to certain power system equipment (not shown) that may cause the conductor 212 to de-energize, for example, a breaker, a recloser, or similar equipment.

Additionally or alternatively, various embodiments contemplate that PFDS units 220 may trigger a power system to de-energize one or more conductors 212 based on various criteria. For example, PFDS units 220 may monitor the zone of interest 222 within field of view 218. Additionally or alternatively, various embodiments contemplate that PFDS units 220 may identify an object within the zone of interest using one or more sensors using one or more sensing technology, for example, Radar, Lasers, Light Detection and Ranging (LIDAR), photometric, infrared, ultraviolet, wireless signals, or combinations thereof, among others. Additionally or alternatively, various embodiments contemplate that PFDS units 220 may use the signals from the sensors to identify an object in the zone of interest. For example, a PFDS unit 220 in shown in FIG. 2 may identify a human 226 within the zone of interest 222. Additionally or alternatively, the PFDS unit 220 may identify a tool 228. Additionally or alternatively, various embodiments contemplate that the PFDS system 202 may identify that tool 228 has certain characteristics, for example, as discussed above with respect to the PFDS system 102 shown in FIG. 1.

Additionally or alternatively, various embodiments contemplate that an object, including a user or tool may provide an identification to the PFDS system 202. For example, FIG. 2 shows a human 226 and tool 228 with identification tags 230. Various embodiments contemplate identification tags 230 placed in one or more locations on the human 226. The locations of identification tags 230 shown in FIG. 2 are illustrative only as this disclosure contemplates that identification tags 230 may be located elsewhere on the human 226.

Various embodiments contemplate that identification tags 230 may be identified by the PFDS system 202 through various methods, for example, as discussed above with respect to the PFDS system 102 shown in FIG. 1. Additionally or alternatively, various embodiments contemplate that identification tags 130 may provide additional information to the PFDS system, for example, as discussed above with respect to the PFDS system 102 shown in FIG. 1.

FIG. 2 shows an embodiment with illustrative distance thresholds in the zone of interest 222. For example, FIG. 2 shows a first distance threshold 232 from conductor 212 and a second distance threshold 234. Various embodiments contemplate that this first distance threshold 232 and second distance threshold 234 may be determined based on characteristics of an identified object in the zone of interest 222. For example, a first object with a first mass, a first density, and a first speed, may case the PFDS system 202 to de-energize conductors 212 if it crosses the first distance threshold 234. Additionally or alternatively, various embodiments contemplate that the first distance threshold 232 may be closer to conductor 212 or further away from conductor 212 in certain circumstances for the identified object. For example, if the identified object is identified to be at a second speed that is greater than the first speed, then the first distance threshold 234 may be further from conductor 212. This increase in the distance threshold may allow the PFDS system 202 to account for the ability of the identified object to reach the conductor 212 more quickly than if it were moving at a slower speed. Additionally or alternatively, various embodiments contemplate that the PFDS system 202 may resolve speed into velocities, where movement towards the conductor may be weighted heavier than movement away from the conductor. For example, a relatively faster movement towards the conductor 212 would cause the first distance threshold 232 to be further from the conductor 212 than a relatively faster movement away from the conductor 212. The may allow the system to increase sensitivity to movements with a relatively higher likelihood of causing contact with the conductor 212.

Additionally or alternatively, various embodiments contemplate that an object identified as an authorized lineman or authorized tool may operate closer to conductor 212 than an unauthorized person or tool. For example, if a lineman or tool is identified by the PFDS system 202, for example through an identification tag 230, preauthorization, or combinations thereof, to be authorized to be closer to conductor 212, then that tool or user may be subject to the second distance threshold 234, while other non-identified people or tools are still subject to the first distance threshold 232. Additionally or alternatively, various embodiments contemplate that the second distance threshold 234 may be adjusted based on characteristics of the lineman or tool, including, but not limited to, speed, density, mass, conductivity, safety features, or combinations thereof, among others.

Additionally or alternatively, various embodiments contemplate that the distance thresholds may also be adjusted based on the location in the power system. For example, FIG. 2 shows a third distance threshold 236 and a fourth distance threshold 238, which may correspond to first distance threshold 232 and second distance threshold 234 respectively. However, since these regions are located near a power pole 206 and cross arm 208, the distances may be greater or less than the distance thresholds away from the poles. For example, a work at a pole may be more stable and allow for a relatively smaller threshold distance, for example, if environmental factors, e.g., wind, are involved. Conversely, threshold distances near a pole may be greater since the stability of the pole may allow a person or tool to generate a greater acceleration leading to a greater speed and a greater likelihood of contact with conductor 212.

Additionally or alternatively, various embodiments contemplate warning threshold distance. For example, a warning may be provided to a person or operator that an object is approaching the distance threshold that may cause de-energization of the conductor 212. This warning threshold may be set to allow the identified object sufficient time to stop short of the distance threshold or conductor 212. Various embodiments contemplate that the warning may be audible, visible, tactile, or combinations thereof, among others.

Illustrative Overhead Power System with a Pre-Fault Detection System (PFDS)

Figure 3:
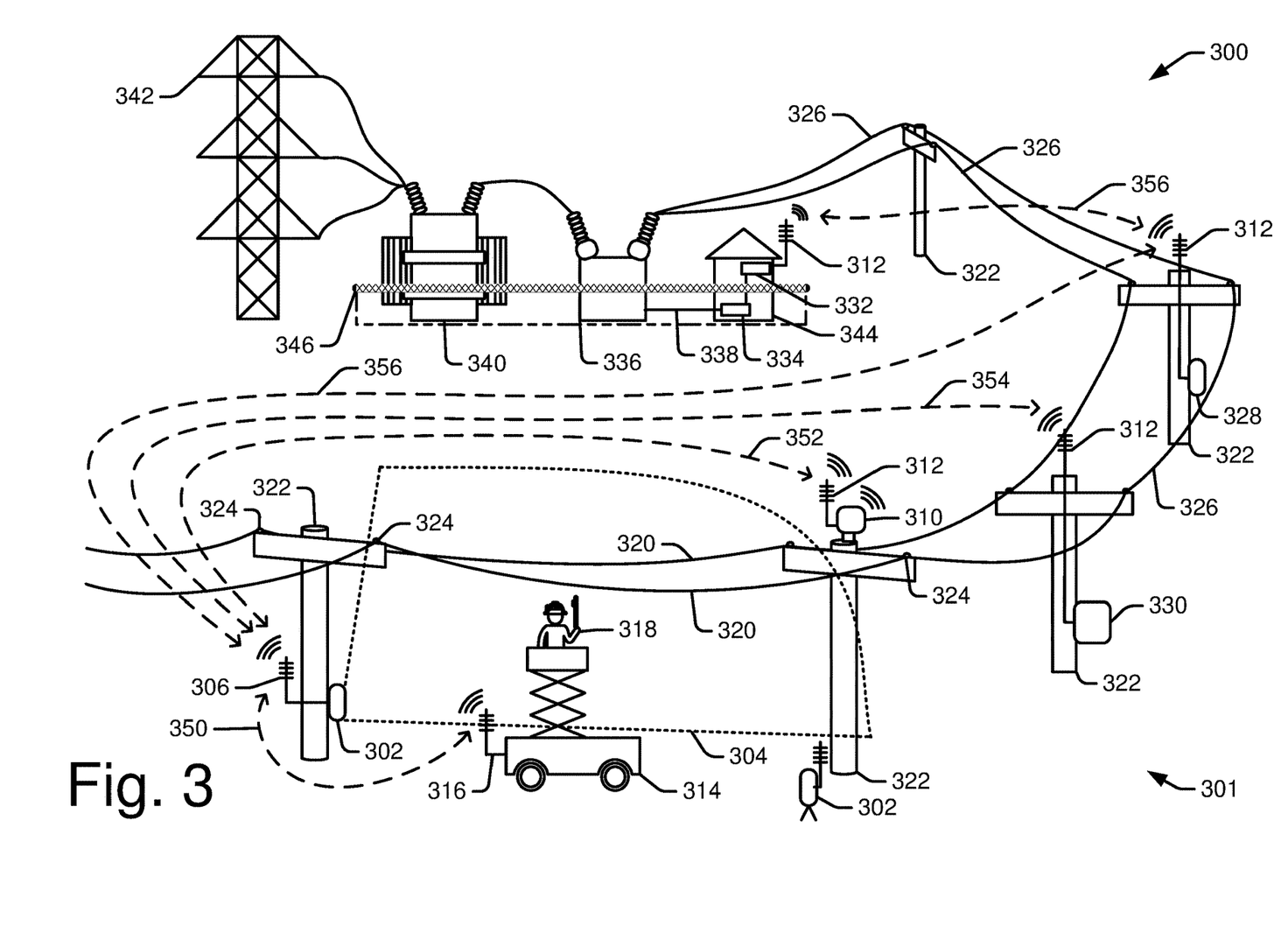

FIG. 3 shows an illustrative embodiment of an overhead power system 300 with a pre-fault detection system (PFDS) 301. Additionally or alternatively to the depicted distribution power system, the PFDS 301 may be used with various other power system embodiments, including but not limited to transmission, substation, generation, battery storage, industrial, commercial, and residential power systems among others.

For example, the overhead power system 300 may comprise conductors 326, supported by insulators 324 that may be attached to power poles 322 or other structure types. The overhead power system 300 may transmit or distribute electrical energy from a substation 346 that may comprise one or more transformers 340 and one or more breakers 336. The substation 346 may also contain a panel house 344 or other enclosed space that may contain relays 334, communication equipment 332, and/or other equipment. The one or more transformers 340 within the substation 346 may change the characteristics of the electrical energy that may be received from a transmission system 342, another distribution system, and/or directly from a generation system. Additionally, or alternatively, one or more power converters, inverters, rectifiers, other power equipment, or combinations thereof may be used in lieu of or in addition to the transformer 340 to change the characteristics of the electrical energy that may be received from a transmission system 342, another distribution system, and/or directly from a generation system. Additionally, or alternatively, the overhead power system 300 may transmit or distribute electrical energy from a switching station or other source in lieu of or in addition to a substation 346.

For example, a PFDS unit 302 may be attached to the power pole 322, set upon the ground, or placed in another suitable location that allows it to monitor a zone of interest 304, as shown by dashed lines in FIG. 3, surrounding at least a portion of a power system component 320 of interest. Additionally or alternatively, the power system component 320 may be any one or more part associated with the overhead power system 300. Additionally or alternatively, various embodiments contemplate that PFDS unit 302 may work independently, or in coordination with other PFDS units 302.

The PFDS unit 302 may communicate with one or more devices using either an internal or external communication subsystem 306 that may incorporate one or more wireless communication modules (including but not limited to radio frequency, infrared, acoustical, optical, laser, or other mode without the use of wires or cables), one or more wired communication modules (including, but not limited to fiber optics, twisted-pair, coaxial, metallic wires, or non-metallic cable), and/or combinations thereof.

If objects within the zone of interest 304 such as a human 318, a machinery or equipment 314, another object, or a combination thereof meets one or more sets of thresholds, the PFDS unit 302 may cause a preventative, corrective, or mitigative action. Additionally or alternatively, the PFDS unit 302 may record objects and their movements (position, direction, velocity, acceleration, and trajectory) within the zone of interest 304.

The PFDS unit 302 may communicate 352 to one or more warning alerts 310. Each of the one or more warning alerts 310 may have a communication module 312 that allows for either one-way or two-way communication with the PDFS unit's 302 communication subsystem 306 either directly or indirectly. The warning alert may comprise of one or more visual alerts, audible alerts, tactile alerts, and/or electrical contact which may be activated when the PFDS unit 302 determines that one or more sets of warning thresholds are met.

The PFDS unit 302 may communicate 350 to one or more machinery or equipment 314. Each of the one or more machinery or equipment 314 may have a communication module 316 that allows for either one-way or two-way communication with the PDFS unit's 302 communication subsystem 306 either directly or indirectly. The machinery or equipment's 314 communication module 316 may be integral or a separate ad-on module that interfaces with the machinery or equipment 314 may cause one or more of the following actions when activated: activate a braking mechanism, stop motion, reverse motion, limit motion, and/or lockout operator controls.

The PFDS unit 302 may communicate to one or more power protection or control devices such as a recloser 330, substation relay 334, or other device. The one or more power system protection or control devices may have a communication module 312 that allows for either one-way or two-way communications with the PDFS unit's 302 communication subsystem 306. Communications between the PFDS unit 302 and one or more power protection or control device(s) may be a direct communication link 354 or indirect communications comprising of one or more communication links 356, repeaters 328, communication equipment 332, and/or other various communication transports.

For example, in some embodiments, the PFDS unit 302 may communicate to the nearest upstream power system protection or control device such as a recloser 330. Additionally or alternatively, the PFDS unit 302 may communicate with a substation 346 relay 334 that sends control communications 338 to a breaker 336 within the substation 346. The power protection or control device may de-energize power when the PFDS unit 302 determines that one or more sets of de-energize thresholds are met.

Illustrative Processes and Techniques

Figure 4:
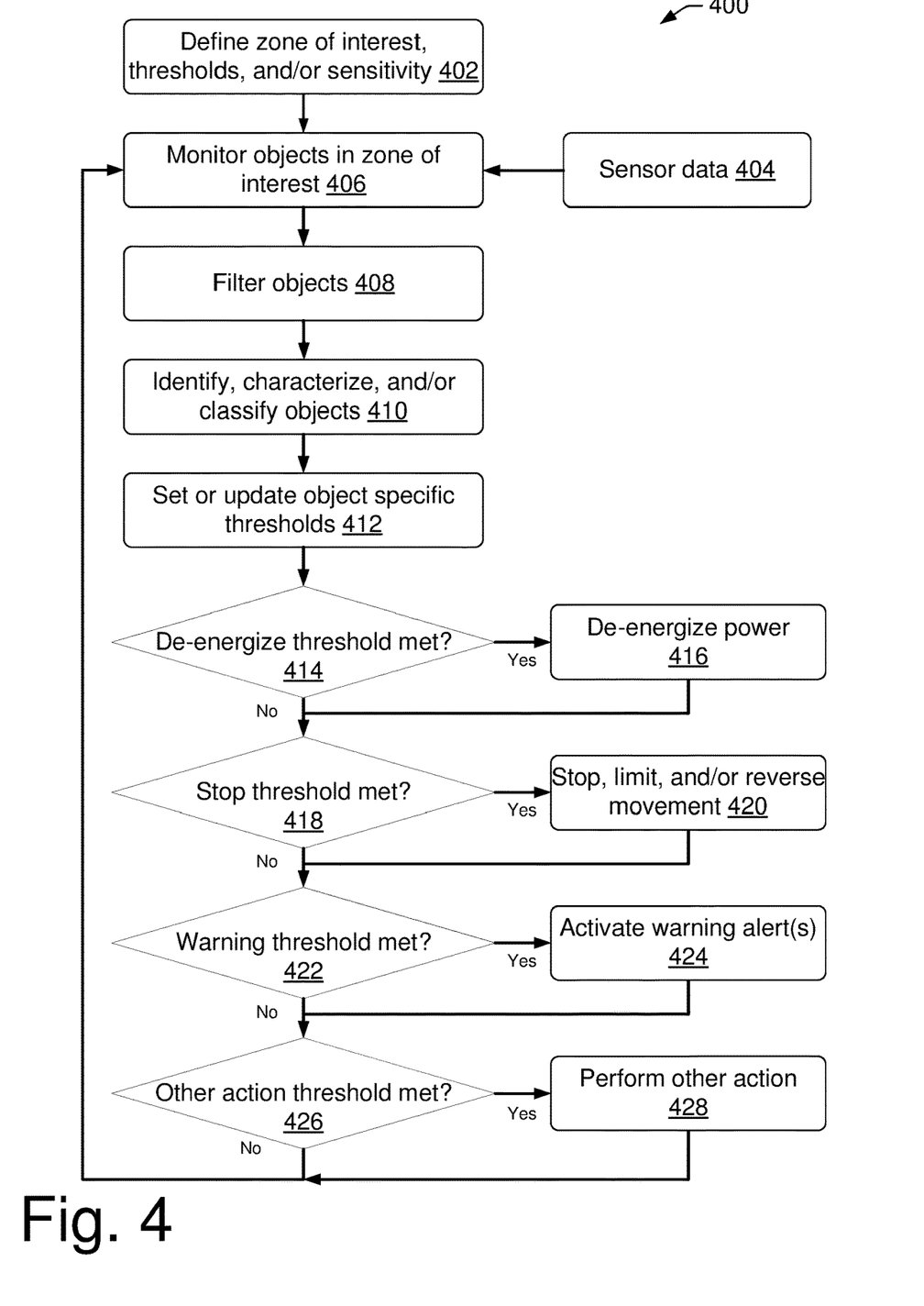
FIGS. 4-6 show illustrative techniques for operating systems to detect and react to objects in proximity to power systems.

FIG. 4 shows an illustrative process and technique 400 for operating an illustrative PFDS system. For example, at time of installation and setup 402, the PFDS may be configured to monitor a defined zone of interest surrounding at least a portion of a power system component. This step may also include defining thresholds, sensitivity, and other applicable settings. Depending on the specific configuration and type of PFDS, the PFDS may also be configured to communicate with other devices including but not limited to power protection systems, machinery, equipment, remote notification systems, remote interfaces, remote computing systems, other PFDS units, and/or other devices.

At 406, the PFDS receives sensor data input 404 from one or more sensors, and, based at least in part on the received sensor data, monitor objects within the zone of interest.

At 408, the PFDS may filter objects that either meet or do not meet a set of criteria. For example, the PFDS may apply a weighting function to an object based at least in part on the criteria. For example, the PFDS may apply a weighting function that may effectively ignore objects, for example, that are not likely large enough to create an electrical fault path such as small animals, including, for example, squirrels and birds. Another example may include ignoring stationary objects, where their velocity remains unchanged. Another example may include ignoring objects tagged with an identification marker. Many additional or alternative filters may be utilized. This approach of filtering out and ignoring objects may allow for a quicker response for faster moving or accelerating objects that potentially pose a greater risk than would be available if the system was required to perform complete analysis for every object before taking action.

At 410, the PFDS may identify, characterize, and/or classify objects within the zone of interest. For example, the system may measure, calculate, and/or determine characteristics of an object that may include but, are not limited to: a position, a velocity, an acceleration, a direction, a trajectory, a size, a shape, a density, a mass, one or more moving parts, a material composition, one or more moving parts, a thermal footprint, a thermal characteristic, an identification, a classification, and/or an identification marker. The system may use one or more characteristics to further identify the object and/or assign a classification to the object. Additionally or alternatively, various embodiments contemplate that characteristics of an object may be determined based at least in part on an identification of the object. For example, the object may be identified by an object identifier, for example, an identification tag, including, but not limited to, a reflector, RFID, preregistered usage with confirmation, or combinations thereof, among others.

At 412, the PFDS may define and/or update various sets of threshold values for objects within the zone of interest based upon the characteristics, identity, and/or classification that was measured, calculated, determined, and/or assigned to an object at 410. In some embodiments, there may also be sets of threshold values that remain constant and unchanged. These sets of thresholds may apply universally to all objects or only select subsets of objects.

Sets of thresholds may comprise of any one or combination of the following: distance, velocity, direction, acceleration, and/or trajectory. Threshold values may be determined or set to provide sufficient time and space for preventative, corrective, and/or mitigative action. Depending on the exact configuration and type of PFDS, the order for which various sets of thresholds are tested in steps 416, 420, 424 and 428, may be re-ordered, combined, and/or omitted.

At 414, the PFDS may check if one or more sets of de-energize thresholds are met. If one or more sets of thresholds are met, the PFDS may cause the power system component to de-energize power 416 before contact with the energized power system component(s) can occur. Additionally or alternatively, various embodiments contemplate that a PFDS unit may send a signal to an upstream power system component capable of de-energizing the power system component, for example, a relay, a switch, a breaker, a recloser, other control device or combinations thereof, among others. Additionally or alternatively, various embodiments contemplate that the signal may be sent wirelessly (including but not limited to radio frequency, infrared, acoustical, optical, laser, or other mode without the use of wires or cables), cabling connections (including, but not limited to fiber optics, metallic, or other non-metallic), or combinations thereof, among others.

At 418, the PFDS may check if one or more sets of stop thresholds are met. If one or more sets of thresholds are met, the PFDS may cause machinery or equipment to stop, limit, or reverse movement 420. Additionally or alternatively, various embodiments contemplate that a PFDS unit may send a signal to the machinery or equipment so that the machinery or equipment can perform one or more actions as directed by the PFDS. Said actions may include but are not limited to activating a brake mechanism, stopping motion; stopping or reversing motion; limiting movement; locking out operator controls, or any other action.

At 422, the PFDS may check if one or more sets of warning thresholds are met. If one or more sets of thresholds are met, the PFDS may send the command to provide one or more warning alert(s) 424. Warning actions may comprise of one or more audible, visual, tactile, electrical contact closure and/or other communication alerts. For example, a siren, buzzer, horn, or other sound may be triggered when the object passes the warning threshold distance. A visual warning may comprise a light or series of lights being flashed or strobed when the object passes the warning threshold distance. A tactile warning may comprise a vibration in a device or clothing used by an operator or people in the area. An electrical contact closure or communication alert may be message sent to another device which will relay or transmit a warning notification such as a text message, e-mail, or other signal.

At 426, the PFDS may check if one or more sets of other action thresholds are met. If one or more sets of thresholds are met, the PFDS may send the command to perform another preventative, corrective, or mitigative action 428.

The aforementioned steps may repeat with the PFDS continuously receiving sensor data input 404 and monitoring the zone of interest 406. These steps have been depicted in a linear fashion, but may occur in parallel. Multiple process threads may occur for different objects or groups of objects, each which may proceed symmetrically or asymmetrically. Objects may also be assigned priorities which may give these objects precedence for tracking, analysis, and determinations.

Additional Illustrative Processes and Techniques

Figure 5:
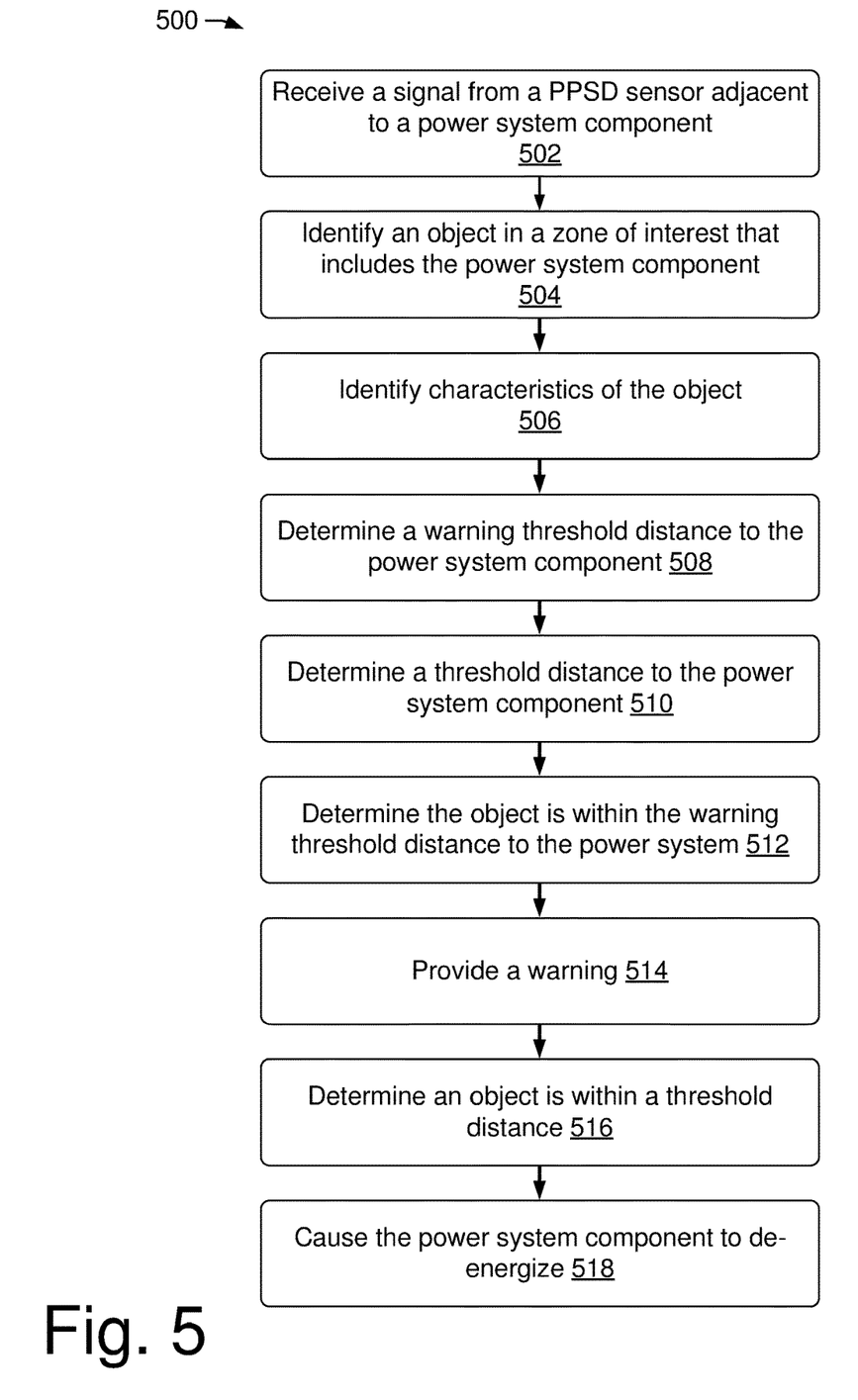

FIG. 5 shows an illustrative process and technique 500 for operating a PFDS. For example, at 502 various embodiments contemplate receiving a signal from a PFDS sensor adjacent to a power system component.

At 504, the PFDS may identify an object in a zone of interest that includes the power system component. Additionally or alternatively, various embodiments contemplate that the component may comprise a conductor, an insulator, a device, a cross arm, or combinations thereof among others.

At 506, the PFDS may identify characteristics of the object. For example, the system may determine an object's velocity (speed and direction), acceleration, inertial characteristics, a size, a mass, a conductivity, or combinations thereof among others. Additionally or alternatively, various embodiments contemplate that characteristics of an object may be determined based at least in part on an identification of the object. For example, the object may be identified by an object identifier, for example, an identification tag, including, but not limited to, a reflector, RFID, preregistered usage with confirmation, or combinations thereof, among others.

At 508, the PFDS may determine a warning threshold distance to the power system component. For example, the warning threshold distance may be based at least in part on, a type of component of the component of the power system, object characteristics, for example, the velocity and acceleration of the object, the identity of the object, or combinations thereof among others. The warning threshold distance may be determined to provide sufficient time and space for the object to avoid contacting the power system component, entering a threshold distance to the power system component, combinations thereof, among others.

At 510, the PFDS may determine a threshold distance to the power system component. For example, the threshold distance may be based at least in part on, a type of component of the component of the power system, object characteristics, for example, the velocity and acceleration of the object, the identity of the object, or combinations thereof among others. The threshold distance may be determined to provide sufficient time and space for the PFDS to cause the power system component to de-energize prior to the object coming into contact with the power system component.

At 512, the PFDS may determine the object is within the warning threshold distance to the power system, for example, based on the warning threshold distance and the object characteristics.

At 514, the PFDS may provide a warning. Various embodiments contemplate that the warning may be audible, visual, or tactile. For example, a siren, buzzer, horn, or other sound may be triggered when the object passes the warning threshold distance. A visual warning may comprise a light or series of lights being flashed or strobed when the object passes the warning threshold distance. A tactile warning may comprise a vibration in a device or clothing used by an operator or people in the area.

At 516, the PFDS may determine an object is within a threshold distance.

At 518, the PFDS may cause the power system component to de-energize. For example, when the object is detected within the threshold distance from the power system component, contact between the object and the power system component may be imminent. As such, the PFDS may de-energize the power system component before contact between the object and power system component occurs. Additionally or alternatively, various embodiments contemplate that a PFDS unit may send a signal to an upstream power system component capable of de-energizing the power system component, for example, a breaker, a recloser, or combinations thereof, among others. Additionally or alternatively, various embodiments contemplate that the signal may be sent wirelessly, for example, through radio signals (including, but not limited to, radio waves ranging from shortwave to long wave lengths), wired connections (including, but not limited to, wire gauges from light gauges to heavy gauges), or combinations thereof, among others.

Figure 6:
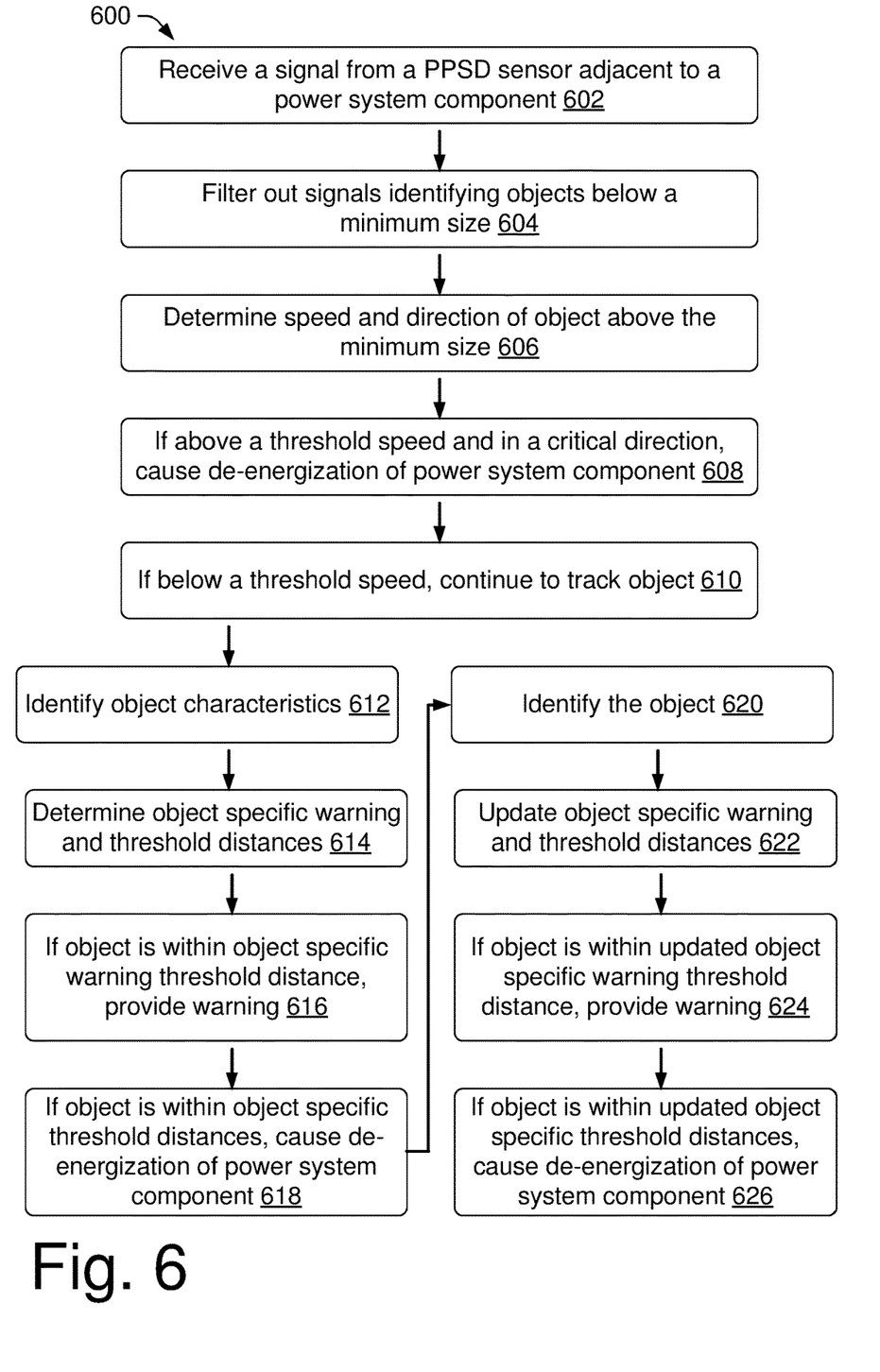

FIG. 6 shows an illustrative process and technique 600 for operating a PFDS. For example, at 602 various embodiments contemplate receiving a signal from a PFDS sensor adjacent to a power system component.

At 604, the PFDS may filter out signals identifying objects below a minimum size. For example, the PFDS may ignore objects that are not likely large enough to cause or sustain damage from the power system component. For example, small animals including squirrels and birds often successfully contact various power system components without causing or sustaining damage.

At 606, the PFDS may determine the speed and direction of object above the minimum size. For example the system may use the data received from the sensor that wasn't filtered out to determine a speed and direction of the object.

At 608, if the object's speed is above a threshold speed and is headed in a critical direction, for example towards the power system component, the PFDS may cause de-energization of the power system component. This approach may allow a quicker de-energization response to fast moving objects than would be available if the system is required to perform further analysis before taking action.

At 610, if the object's speed is below the threshold speed, the PFDS may continue to track the object. Additionally or alternatively, various embodiments contemplate that if the object is below the threshold speed, the PFDS may continue to analyze the object to determine additional object characteristics.

At 612, the PFDS system may identify object characteristics. For example, the system may use the received data to determine a mass, a size (for example, a size that is more specific than merely larger than the minimum size), inertial characteristics, or combinations thereof among others.

At 614, the PFDS system may determine object specific warning and threshold distances. For example, the warning and threshold distances may be based at least in part on, a type of component of the component of the power system, object characteristics, for example, the velocity and/or an acceleration of the object, the identity of the object, or combinations thereof among others. For example, an object characteristic may include, but is not limited to position, a direction of movement and/or acceleration, a trajectory, one or more moving parts, a size, a shape, a mass, a density, a thermal footprint, a material composition, an identification marker, and/or a classification. The warning threshold distance may be determined to provide sufficient time and space for the object to avoid contacting the power system component, entering a threshold distance to the power system component, or combinations thereof, among others. The threshold distance may be determined to provide sufficient time and space for the PFDS system to cause the power system component to de-energize prior to the object coming into contact with the power system component.

At 616, if object is within the object specific warning threshold distance, the PFDS may provide warning. Various embodiments contemplate that the warning may be audible, visual, or tactile. For example, a siren, buzzer, horn, or other sound may be triggered when the object passes the warning threshold distance. A visual warning may comprise a light or series of lights being flashed or strobed when the object passes the warning threshold distance. A tactile warning may comprise a vibration in a device or clothing used by an operator or people in the area.

At 618, if the object is within object specific threshold distances, the PFDS may cause de-energization of power system component. For example, when the object is detected within the object specific threshold distance from the power system component, contact between the object and the power system component may be imminent. As such, the PFDS may de-energize the power system component before contact between the object and power system component occurs. Additionally or alternatively, various embodiments contemplate that a PFDS unit may send a signal to an upstream power system component capable of de-energizing the power system component, for example, a breaker, a recloser, or combinations thereof, among others. Additionally or alternatively, various embodiments contemplate that the signal may be sent wirelessly, for example, through radio signals (including, but not limited to, radio waves ranging from shortwave to long wave lengths), wired connections (including, but not limited to, wire gauges from light gauges to heavy gauges), or combinations thereof, among others.

At 620, the PFDS may identify the object. For example, the PFDS may use the received sensor data to determine an identity of the object. Additionally or alternatively, the PFDS may identify the object based at least in part on an identification indictor, for example, a tag on the object.

At 622, the PFDS may update the object specific warning and threshold distances. For example, based on the identification of the object, the warning and threshold distances may be adjusted. For example, if the object is identified as an authorized lineman, the threshold distances may be reduced as the authorized lineman is allowed closer to the energized power system component than an unauthorized person. If the object is identified as an unauthorized crane, the warning and threshold distances may be increased since, for example, the unauthorized crane isn't likely supposed to be close to the power system component. Additionally or alternatively, the crane is also capable of relatively high accelerations and speeds the PFDS may account for to maintain sufficient time to de-energize the power system component.

At 624, if object is within updated object specific warning threshold distance, the PFDS may provide a warning. Various embodiments contemplate that the warning may be audible, visual, or tactile.

At 626, if object is within updated object specific threshold distances, cause de-energization of power system component.

Illustrative Schematic Block Diagram

Figure 7:
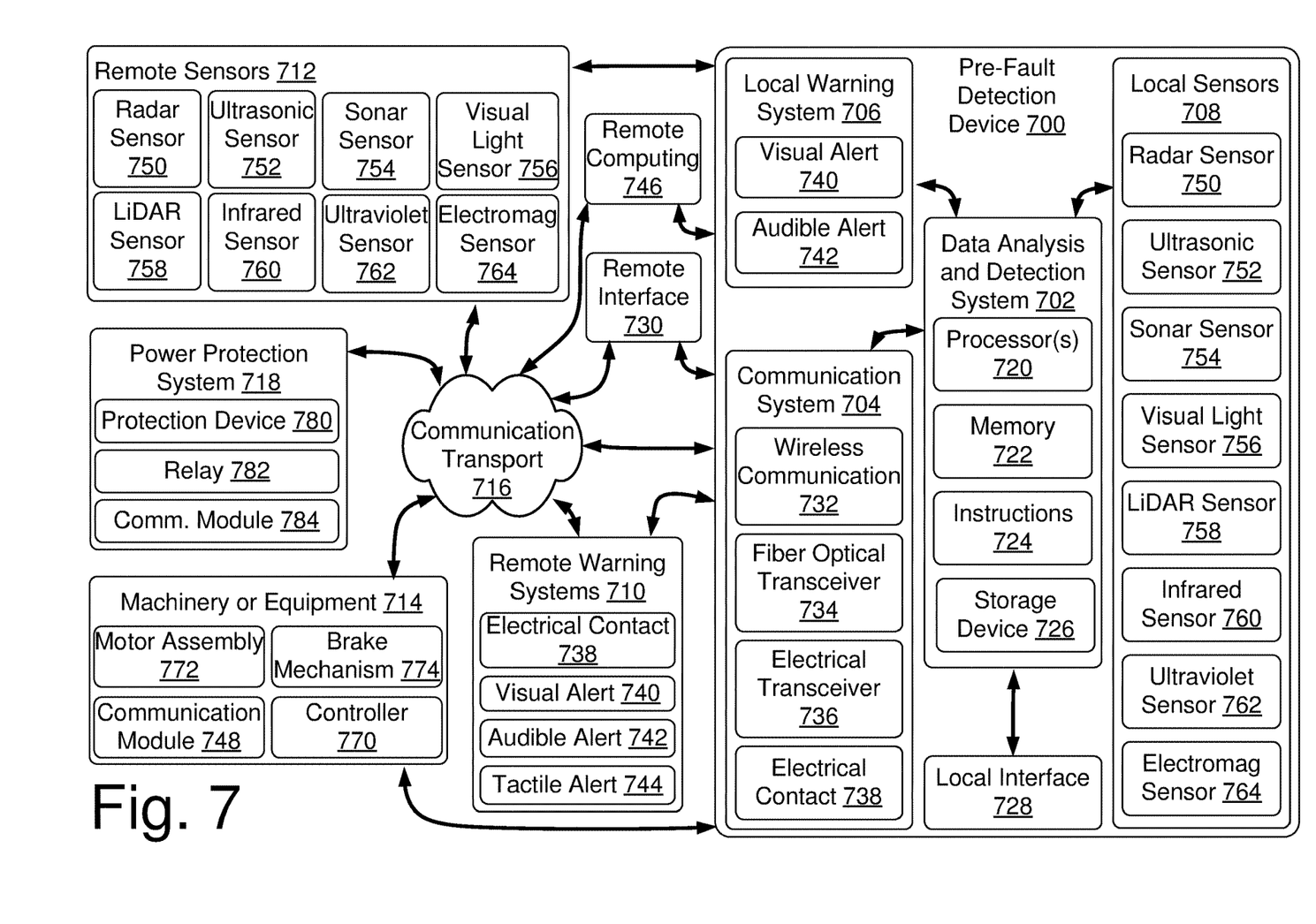
FIGS. 7-8 show illustrative embodiments of schematic block diagrams of computing devices and architectures for systems to detect and react to objects in proximity to power systems.

FIG. 7 illustrates a representative pre-fault detection device 700 that may, but need not necessarily be used to, implement the system and methods described herein, in accordance with various embodiments. The techniques and mechanisms described herein may be implemented by multiple instances of the pre-fault detection device 700, as well as by any other pre-fault detection device, system, and/or environment. The pre-fault detection device 700 shown in FIG. 7 is only one example of a pre-fault detection device and is not intended to suggest any limitation as to the scope of use or functionality of any pre-fault detection device utilized to perform the processes and/or procedures described above.

In at least one configuration, the pre-fault detection device 700 includes at least one data analysis and detection subsystem 702 that may receive data from one or more local sensors 708, remote sensors 712, or combinations thereof. The data analysis and detection subsystem comprises of one or more processors 720 and memory 722. The processor 720 executes instructions 724 to perform a variety of functions that includes but is not limited to processing data received from the local sensors 708 and the remote sensors 712 to determine when a preventative, a corrective, or a mitigative action should be taken. The sensor data may also be used for pattern recognition, predictive analytics, statistical analysis, algorithm development and/or artificial intelligence.

In some embodiments, the one or more processors 702 may include one or more central processing unit ("CPU"), graphics processing unit ("GPU"), system on a chip ("SoC"), application specific integrated circuit ("ASICs"), field programmable gate array ("FPGA"), other processing units or components known in the art, and/or some combination thereof.

The memory 722 may be volatile (such as RAM or cache), non-volatile (such as ROM, flash memory, miniature hard drive, memory card, or the like) or some combination thereof and may either be integrated within the one or more processors or be a separate component. The memory may be used for storing instructions 724 to be executed, data to be processed, or any number of other information.

Depending on the specific configuration and type of the pre-fault detection device 700, the local sensors 708 and/or remote sensors 712 may comprise of one or more radar sensor 750, ultrasonic sensor 752, sonar sensor 754, visual light sensor 756, LiDAR sensor 758, infrared 760, ultraviolet sensor 762, electromagnetic sensor 764, and/or some combination thereof among others. Sensors may supply the data analysis and detection subsystem 702 with either analog or digital data.

In some embodiments, the data analysis and detection subsystem 702 may include a storage device 726 that may store instructions 724, reference data, data received from the local sensors 708, remote sensors 712, and/or operational data that may serve as a record of events and operations. The storage device includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

The pre-fault detection device 700 may also include a communication subsystem 704 comprising of one or more modes of communication: wireless communications 732, fiber optic transceiver 734, electrical transceiver 736, and/or electrical contact 738. The wireless communications may any type of wireless connection including but not limited to radio frequency ("RF"), infrared, acoustical, optical, laser, or other mode without the use of wires or cables. The fiber optic transceiver 734 may be any communication module that sends and receives light over a cable for communications. The electrical transceiver 736 may be any communication module that sends and receives electrical signals over a cable for communications. And the electrical contact 738 is one or more simple contact closure that used for either discrete inputs or output signals. The communication subsystem 704 may be used to communicate with various components, systems, and equipment either directly or through a communication transport 716. The communications transport 716 could be a wired, wireless, or a combination thereof comprised of one or more communication paths or routes.

The pre-fault detection device 700 may have a local interface 728 and/or a remote interface 730, each comprising of one or more of the following components: a touch screen, a keypad, a keyboard, a mouse, a stylus, a voice input, a motion input, a speaker, a display, a printer, etc. The local interface 728 and/or remote interface 730 may be used for a variety of functions that includes but is not limited to setup, configuration, supervisory control, etc.

In some embodiments, the pre-fault detection device 700 may include a local warning subsystem 706 and/or one or more remote warning systems 710, each may comprise of one or more of the following components: a visual alert 740, an audible alert 742, a tactile alert 744, and/or electrical contact 738, among others.

In some embodiments, pre-fault detection device 700 may communicate with a power protection system 718 via its communication subsystem 704 either directly or through a communication transport 716. The power protection system 718 may have a communication module 784 integral to the equipment or as a separate add-on component to allow it to send and receive communication signals. The power protection system 718 may de-energize the one or more electrical components as a preventative, corrective, or mitigative action as directed to by the pre-fault detection device 700. This may be accomplished through the use of a relay 782 that may be used to control one or more protection devices 780 responsible for de-energizing one or more electrical system components.

In some embodiments, pre-fault detection device 700 may communicate with machinery or equipment 714 via its communication subsystem 704 either directly or through a communication transport 716. The machinery or equipment 714 may have a communication module 748 integral to the equipment or as a separate add-on component to allow it to send and receive communication signals. The machinery or equipment 714 may have a controller 770 or other means to perform one or more preventative, corrective, or mitigative actions as directed to by the pre-fault detection device 700. Said actions may include but is not be limited to activating a brake mechanism 774 to stop motion; stopping or reversing one or more motor assemblies 772; limiting movement; locking out operator controls, or any other action.

Depending on the specific configuration and type of pre-fault detection device 700, it may communicate with one or more remote computing 746 equipment via its communication system 704 either directly or through a communication transport 716. The remote computing 746 may include, but not limited to other pre-fault detection devices 700, remote servers, computers, hand held or laptop devices, microprocessor based systems, set top boxes, programmable electronics, field programmable gate arrays ("FPGAs") application specific integrated circuits ("ASICs") distributive computing environments that include any of the above systems or devices, and/or the like. The remote computing 746 may be used for a variety of functions that includes but is not limited to supervisory control and data acquisition ("SCADA"), remote monitoring, remote control, data collection, data processing, pattern recognition, predictive analytics, statistical analysis, algorithm development artificial intelligence, diagnostics, and/or other operations.

Illustrative Computing Device and Architecture

Figure 8:
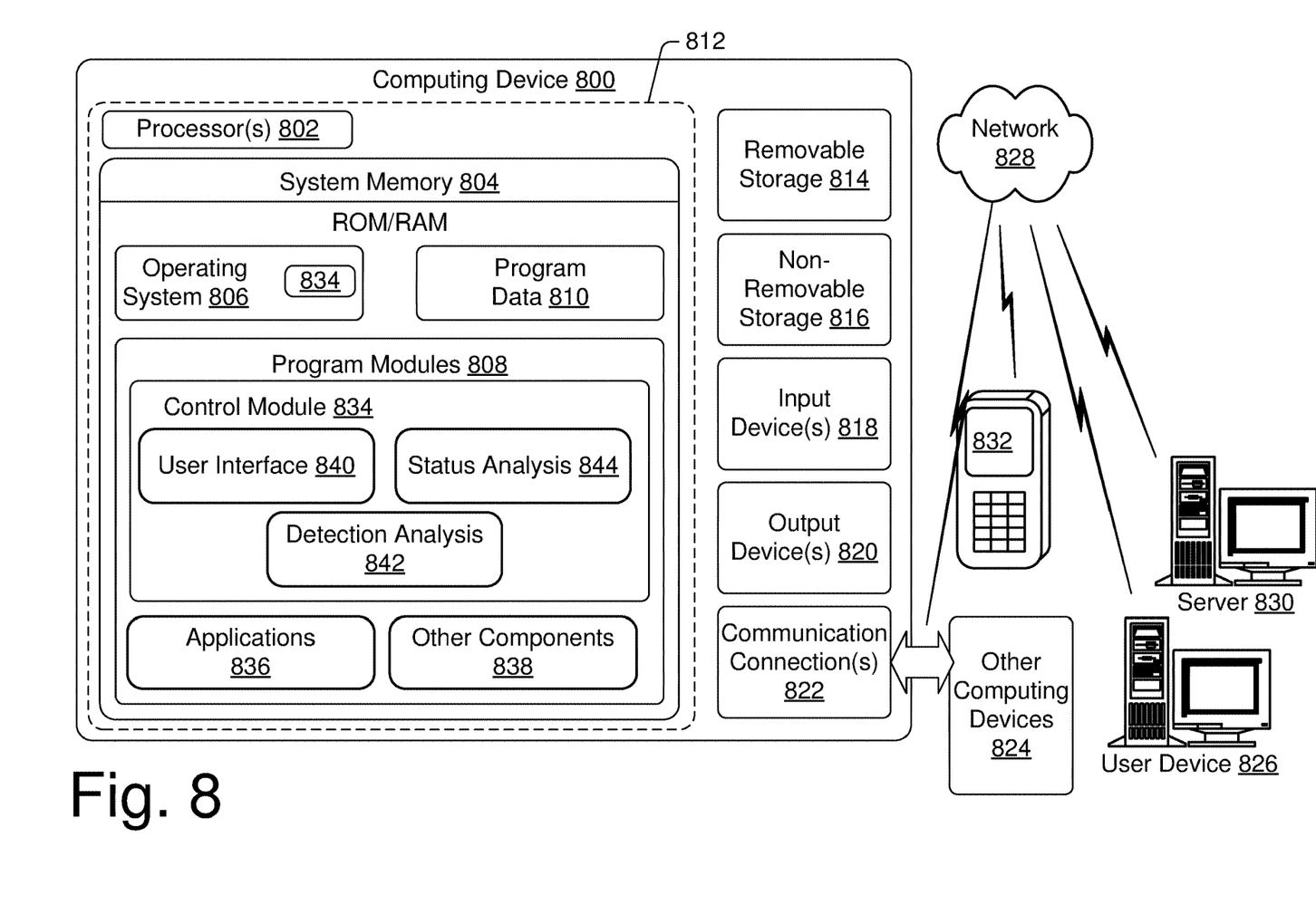

FIG. 8 illustrates a representative computing device 800 that may, but need not necessarily be used to, implement the system and methods described herein, in accordance with various embodiments. The techniques and mechanisms described herein may be implemented by multiple instances of the computing device 800, as well as by any other computing device, system, and/or environment. The computing device 800 shown in FIG. 8 is only one example of a computing device and is not intended to suggest any limitation as to the scope of use or functionality of any computing device utilized to perform the processes and/or procedures described above.

In at least one configuration, the computing device 800 includes at least one processor 802 and system memory 804. The processor(s) 802 may execute one or more modules and/or processes to cause the computing device 800 to perform a variety of functions. In some embodiments, the processor(s) 802 may include a central processing unit (CPU), a graphics processing unit (GPU), both CPU and GPU, or other processing units or components known in the art. Additionally, each of the processor(s) 802 may possess its own local memory, which also may store program modules, program data, and/or one or more operating systems.

Depending on the exact configuration and type of the computing device 800, the system memory 804 may be volatile (such as RAM), non-volatile (such as ROM, flash memory, miniature hard drive, memory card, or the like) or some combination thereof. The system memory 804 may include an operating system 806, one or more program modules 808, and may include program data 810. The operating system 806 includes a component-based framework 834 that supports components (including properties and events), objects, inheritance, polymorphism, reflection, and provides an object-oriented component-based application programming interface (API). The computing device 800 is of a very basic illustrative configuration demarcated by a dashed line 812. Again, a terminal may have fewer components but may interact with a computing device that may have such a basic configuration.

Program modules 808 may include, but are not limited to, applications 836, a control module 834, a user interface 840, a detection analysis module 842, a status analysis module 844, and/or other components 838.

The computing device 800 may have additional features and/or functionality. For example, the computing device 800 may also include additional data storage devices (removable and/or non-removable) such as, for example, magnetic disks, optical disks, or tape. Such additional storage is illustrated in FIG. 8 by removable storage 814 and non-removable storage 816.

The storage devices and any associated computer-readable media may provide storage of computer readable instructions, data structures, program modules, and other data. Computer-readable media includes, at least, two types of computer-readable media, namely computer storage media and communication media.

As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave. As defined herein, computer storage media does not include communication media.

Moreover, the computer-readable media may include computer-executable instructions that, when executed by the processor(s) 802, perform various functions and/or operations described herein.

The computing device 800 may also have input device(s) 818 such as a keyboard, a mouse, a pen, a voice input device, a touch input device, etc. Output device(s) 820, such as a display, speakers, a printer, etc. may also be included.

The computing device 800 may also contain communication connections 822 that allow the device to communicate with other computing devices 824, such as over a network. By way of example, and not limitation, communication media and communication connections include wired media such as a wired network or direct-wired connections, and wireless media such as acoustic, radio frequency (RF), infrared, and other wireless media. The communication connections 822 are some examples of communication media. Communication media may typically be embodied by computer readable instructions, data structures, program modules, etc.

FIG. 8 also shows a schematic diagram of an illustrative operating environment where an illustrative system may operate. For example, various embodiments of the system may operate on the computing device 800. The computing device 800 may interact with a user 826 directly or indirectly. The computing device may be connected to a network 828. The network device 828 may provide access to other computing devices 824 including a server 830, mobile devices 832, and/or other connections and/or resources. Connections may be wired or wireless.

The illustrated computing device 800 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments. Any portion of one embodiment may be used in combination with any portion of a second embodiment.

What is claimed is:

1. A system comprising:
   one or more processors;
   memory; and
   instructions stored on the memory that, when executed by the one or more processors, configure the one or more processors to perform operations comprising:
   receiving one or more signals from one or more sensors, wherein the one or more sensors are arranged to monitor a zone of interest adjacent to a power system component;
   determining a type of component associated with the power system component;
   identifying, based at least in part on the one or more signals, an object within the zone of interest;
   identifying one or more characteristics of the object;
   determining, based at least in part on the one or more characteristics and the type of component, a threshold distance associated with the power system component;

determining, based at least in part on the one or more signals, that the object is within the threshold distance; and causing one or more of a preventative action, a corrective action, or a mitigative action to be performed based at least in part on the one or more characteristics and the object being within the threshold distance.

2. The system of claim 1, wherein:

determining the threshold distance comprises determining a de-energization threshold distance associated with the power system component;

determining that the object is within the threshold distance comprises determining the object is within the de-energization threshold distance; and causing the one or more of the preventative action, the corrective action, or the mitigative action to be performed comprises causing the power system component to de-energize.

3. The system of claim 2, wherein causing the power system component to de-energize comprises sending a signal to an upstream relay, switch, breaker, recloser, or other control device in electrical, optical, or wireless communication with the power system component.

4. The system of claim 1, the operations further comprising:

determining a warning threshold distance associated with the power system component;

determining that the object is within the warning threshold distance; and causing a warning to be issued.

5. The system of claim 4, wherein the warning comprises one or more of an audible, a visual, a tactile, or a remote signal notification.

6. The system of claim 1, the operations further comprising:

determining an equipment stop threshold distance associated with the power system component;

determining that the object or equipment associated with the object is within the equipment stop threshold distance; and causing the equipment to at least one of limit motion, stop motion, or reverse motion.

7. The system of claim 6, wherein causing the equipment to at least one of limit motion, stop motion, or reverse motion comprises sending a signal to the equipment in electrical, optical, or wireless communication.

8. The system of claim 1, wherein the one or more characteristics comprise a position, a velocity, an acceleration, a direction, a trajectory, one or more moving parts, a size, a shape, a mass, a density, a thermal footprint, a material composition, an identification marker, an identification, or a classification.

9. The system of claim 1, the operations further comprising based at least in part on the one or more characteristics, determining the preventative action, the corrective action, or the mitigative action.

10. The system of claim 1, wherein the power system component comprises one or more of a conductor, a wire, a busbar, a tap, an insulator, a support structure, a control panel, a panelboard, a switchboard, a switchgear, a switch, a disconnect, a transformer, a recloser, a regulator, a capacitor, a reactor, a resistor, an inductor, an arrester, a fault indicator, a luminaire, a rectifier, an inverter, a converter, a battery, a generator, a motor, an outlet, a communication device, an overcurrent protection, an overload, a fuse, or a breaker.

11. The system of claim 1, the operations further comprising receiving data from at least one of an identification tag associated with the object or a database, and wherein identifying the one or more characteristics is based at least in part on the data.

12. The system of claim 1, wherein the one or more sensors comprise one or more of a radar, an ultrasonic, a sonar, an infrared, a visual light, a laser, a LiDAR, an x-ray, a gamma-ray, an ultraviolet, a radio wave, a microwave, other electromagnetic sensor, or combination thereof.

13. The system of claim 12, wherein:

the one or more sensors are located either locally, remotely, or combination thereof to the system; and at least one of the one or more sensors is configured to send data to the system in one or more of electrical, optical, wireless communications, or combinations thereof.

14. A device including one or more non transitory computer readable media storing instructions executable by a processor, wherein the instructions, when executed, cause the processor to perform operations comprising:

receiving one or more signals from one or more sensors monitoring an area adjacent to a power system component;

identifying an object in a zone of interest within the area, the zone of interest including at least a portion of the power system component;

identifying one or more characteristics of the object;

identifying a component type of the power system component;

determining, based at least in part on the component type and the one or more characteristics, a threshold distance associated with de-energizing the power system component;

determining that the object is within the threshold distance; and causing the power system component to de-energize.

15. A device including one or more non transitory computer readable media storing instructions executable by a processor, wherein the instructions, when executed, cause the processor to perform operations comprising:

receiving one or more signals from one or more sensors monitoring an area adjacent to a power system component;

identifying an object in a zone of interest, the zone of interest including at least a portion of the area and a portion of the power system component;

identifying one or more characteristics of the object;

determining, based at least in part on the one or more characteristics, an object type associated with the object;

identifying a component type of the power system component;

determining, based at least in part on the object type and the component type, a threshold distance associated with the power system component;

determining that the object is within the threshold distance; and causing a warning to be issued.

16. The device of claim 15, wherein the warning comprises one or more of an audible warning, a visual warning, a tactile warning, or a remote signal notification.

17. A device including one or more non transitory computer readable media storing instructions executable by a processor, wherein the instructions, when executed, cause the processor to perform operations comprising:

receiving one or more signals from one or more sensors monitoring an area adjacent to a power system component;

identifying an object in a zone of interest, the zone of interest including at least a portion of the area and at least a portion of the power system component;

identifying one or more characteristics of the object;

identifying a component type of the power system component;

determining, based at least in part on the one or more characteristics and the component type, a threshold distance associated with the power system component;

determining that the object is within the threshold distance; and causing, based at least in part on the object being within the threshold distance, at least one of a machine or an equipment to limit motion, stop motion, or reverse motion.

18. A system comprising:

one or more processors;

memory; and instructions stored on the memory that, when executed by the one or more processors, configure the one or more processors to perform operations comprising:

receiving one or more signals from one or more sensors monitoring an area adjacent to a power system component;

determining, based at least in part on the one or more signals, a first object within the area and a second object within the area;

determining that the first object is safe from the power system component;

determining a speed and a direction of the second object;

based at least in part on the speed being above a speed threshold and the direction being within a direction range, causing a first action to be performed;

based at least in part on the speed being below the speed threshold, identifying one or more object characteristics;

determining, based at least in part on the one or more object characteristics, an object specific threshold distance; and based at least in part on the second object being within the object specific threshold distance, causing a second action to be performed.

19. The system of claim 18, the operations further comprising:

identifying an object type associated with the second object;

determining a second object specific threshold distance;

based at least in part on the second object being within the second object specific threshold distance, causing the second action to be performed.

20. The system of claim 18, wherein at least one of the first action or the second action comprises causing the power system component to de-energize.

21. The system of claim 18, the operations further comprising:

determining an object specific warning threshold distance;

based at least in part on the second object being within the object specific warning threshold distance, providing a warning.

22. The system of claim 21, wherein the warning comprises one or more of an audible, visual, tactile, or remote signal notification.

23. The system of claim 21, the operations further comprising:

identifying an object type associated with the second object;

determining a second object specific threshold distance;

based at least in part on the second object being within the second object specific threshold distance, providing the warning.

24. The system of claim 23, wherein the warning comprises one or more of an audible, visual, tactile, or remote signal notification.

25. The system of claim 18, wherein the first action or the second action comprises causing a machine or equipment to limit motion, stop motion, or reverse motion.

26. The system of claim 18, wherein the one or more object characteristics comprise at least one of a position, a velocity, a direction, a trajectory, one or more moving parts, a size, a shape, a mass, a density, a thermal footprint, a material composition, an identification marker, an identification, or a classification.

27. The system of claim 18, wherein the power system component comprises one or more of a conductor, a wire, a busbar, a tap, an insulator, a support structure, a control panel, a panelboard, a switchboard, a switchgear, a switch, a disconnect, a transformer, a recloser, a regulator, a capacitor, a reactor, a resistor, an inductor, an arrester, a fault indicator, a luminaire, a rectifier, an inverter, a converter, a battery, a generator, a motor, an outlet, a communication device, an overcurrent protection, an overload, a fuse, or a breaker.

28. The system of claim 18, wherein causing the power system component to de-energize comprises sending a signal to a relay, switch, breaker, recloser, or other control device in electrical, optical, or wireless communication with the power system component.

* * * * *